United States Patent [19]
Jensen

[11] Patent Number: 5,461,762
[45] Date of Patent: Oct. 31, 1995

[54] COMPOUND ELLIPTICAL TIRE RASP BLADE

[75] Inventor: Wayne Jensen, Olympia Fields, Ill.

[73] Assignee: B & J Manufacturing Co., Glenwood, Ill.

[21] Appl. No.: 114,773

[22] Filed: Aug. 31, 1993

[51] Int. Cl.[6] .................................................. B23D 67/06
[52] U.S. Cl. ........................................ 29/78; 29/79; 407/82
[58] Field of Search ............................. 29/78, 79; 407/62

[56] References Cited

U.S. PATENT DOCUMENTS

| | | | |
|---|---|---|---|
| 2,703,446 | 3/1955 | Jensen | 29/79 |
| 2,896,309 | 7/1959 | Jensen | 29/79 |
| 3,074,148 | 1/1963 | Hemmeter | 29/79 |
| 3,082,506 | 3/1963 | Jensen | 29/79 |
| 3,528,151 | 9/1970 | Walter | 29/78 |
| 4,021,899 | 5/1977 | Jensen | 29/79 |
| 4,091,516 | 5/1978 | Jensen et al. | 29/78 |
| 4,336,640 | 6/1982 | Willinger | 29/79 |
| 4,988,241 | 1/1991 | Colligan | 402/62 |
| 5,033,175 | 7/1991 | Jensen | 29/78 |
| 5,054,177 | 10/1991 | Jensen | 29/78 |

*Primary Examiner*—Maurina T. Rachuba
*Attorney, Agent, or Firm*—Niro, Scavone, Haller & Niro

[57] ABSTRACT

A tire rasp blade for use in a tire buffing machine having a rotating hub. A set of rasp blades is arranged in a plurality of circumferential rows. Each of the blades has a non-planar elongated body with generally planar portions, and an arcuate working edge having teeth which extend in a direction generally parallel to the direction of hub rotation. The working edge includes two elliptical-shaped segments.

11 Claims, 2 Drawing Sheets

FIG. 4
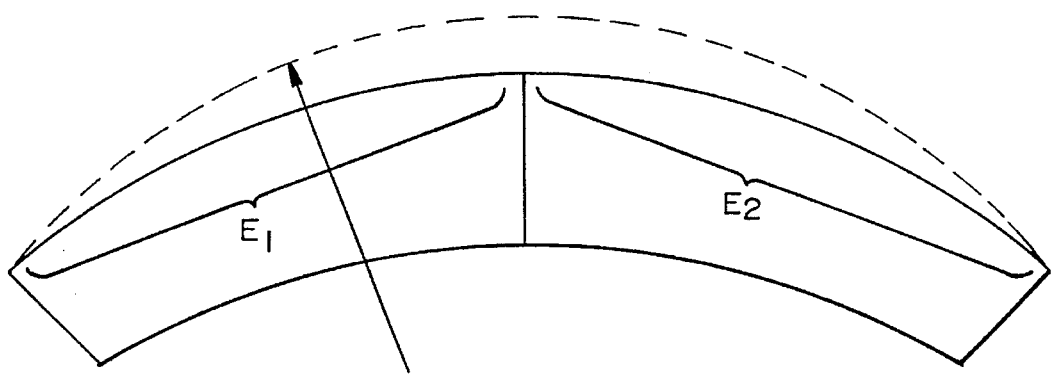
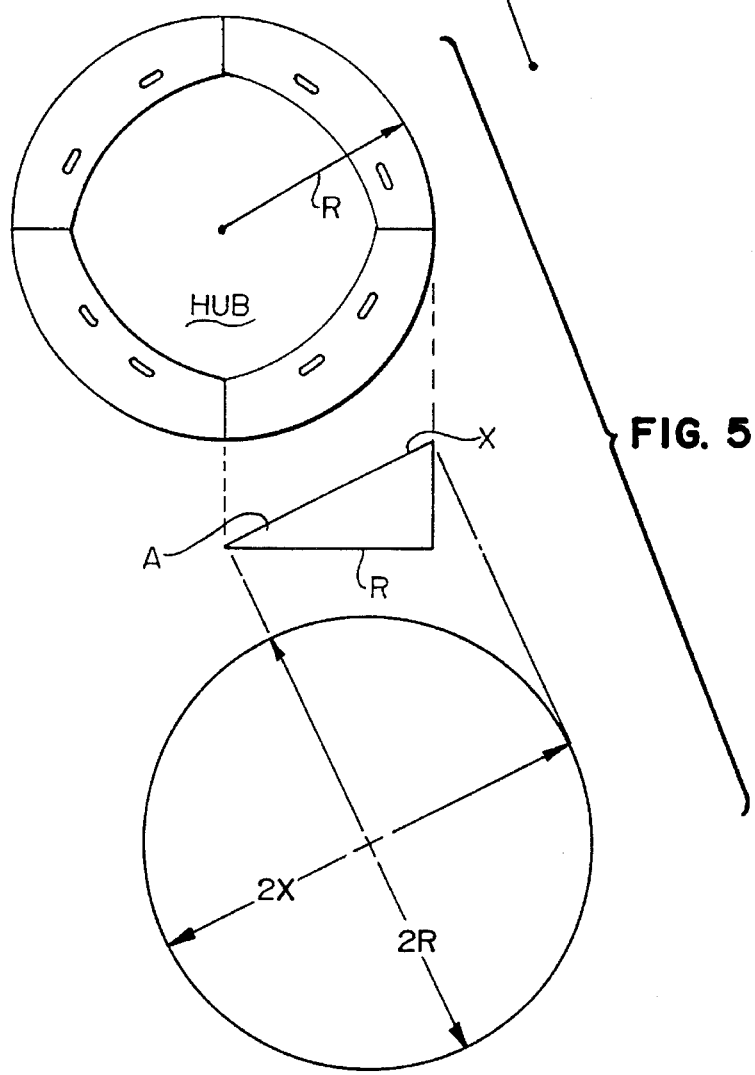
FIG. 5

COMPOUND ELLIPTICAL TIRE RASP BLADE

BACKGROUND OF THE INVENTION

The present invention relates to a new tire rasp blade for use in tire buffing machines.

The disclosures of U.S. Pat. Nos. 5,033,175, 4,019,234 and 2,703,446 are incorporated herein by reference into this application.

Tire buffing machines are well known in the tire retreading industry. Conventionally, a tire buffing machine includes both a structure for mounting a used tire and a rasp hub which removes the worn tread from the used tire prior to the retreading process. The used tire is rotated while it is held against the rapidly rotating rasp hub whose outside perimeter is provided with a multitude of tire rasp blades. When so engaged against the used tire, the blades cut or shear small segments of rubber from the worn tread surface area of the tire. In this way, the tire is "buffed" to remove the unwanted used tread and to achieve an evenly textured surface suitable for retreading.

Tire rasp blades, together with intervening spacers, are assembled on the periphery of the rasp hub between the hub front and back plates. U.S. Pat. Nos. 2,703,446 and 4,019,234 disclose such conventional prior art rasp hub assemblies wherein the back plate of the hub has axially directed support pins on which are mounted the rasp blades and spacers. The front plate is then assembled onto the support pins against the assembled blades and spacers and locked into place.

Use of bent blades with flat spacers is described in U.S. Pat. No. 5,033,175. This arrangement creates a circumferentially interlocked hub with less potential for mechanical failure at high rotational speeds.

It has been conventional practice to form the outer-most portion or "working edge" of the tire rasp blade as a segment of a circle. That is, the working edge is in the form of an arc defined by a common radius. However, when such tire rasp blades are assembled into a hub, they are inclined relative to the direction of rotation of the hub. As a result, the actual geometry of the working edge of each blade—as it is rotated on the hub—is no longer circular relative to the surface of the tire being buffed. In effect, as the buffing hub rotates, the working edge of the inclined tire rasp blades cyclically move toward and away from the surface of the tire. This, in turn, causes inefficient operation and uneven buffing of the tire.

SUMMARY OF THE INVENTION

The present invention is directed to a novel tire rasp blade having elements whose shape and configuration affords it certain advantages over prior art rasp blade designs. Moreover, the novel tire rasp blade of the present invention enhances performance. This is achieved because the configuration of the blade body and working edge permits the teeth on the working edge to attack the tire tread with more uniformity and precision.

In accordance with the present invention, a bent tire rasp blade for use in a tire buffing machine is provided. The bent blade has a nonplanar elongated body having two planar portions or "flats." The blade also includes an outer working edge having a plurality of teeth which extend in a direction generally parallel to the direction of hub rotation. The outer working edge is comprised of two curved surfaces, each curve defining a portion of an ellipse. The two curved elliptical surfaces of the outer working edge intersect at a mid-portion of the blade where the two planar end portions of the blade body are joined.

The use of an elliptically-shaped outer working edge compensates for the inclined positioning of the blades on the hub. As a result, the "effective geometry" of the working edges of the inclined blades as they rotate on the hub is circular.

In the context of the present invention, the terms "nonplanar," "bent" and "V-shaped" are all intended to describe the geometry of rasp blades once they have been assembled within the hub assembly, and then viewed radially toward the hub's axis of rotation from a point outside the circumference of the hub. Thus, a "nonplanar" blade body is one whose length, from end to end, does not lie in a single plane.

"Symmetrical" as to describe blades is defined herein to mean a type of blade in which a repetitive pattern is utilized, such that one half of the blade is a mirror image of the other. However, while the preferred embodiment of the present invention includes the use of symmetrical blades, the present invention also contemplates that the blades may be nonplanar and asymmetrical, and these forms are contemplated by the present invention as well.

Additionally, the bent blade is provided with teeth which are arranged generally parallel to the axis of rotation of the hub, as shown in FIG. 3. In a preferred embodiment, the teeth are angularly offset from the flats by an angle of about 3° to 5°. In this embodiment, the leading edge of each tooth—the edge pointing in the direction of hub rotation—will be displaced to one side of the blade body along one planar portion of the blade and to the other side of the blade body along the other planar portion of the blade.

It has also been determined that the present invention gives the operator better control and stability during cutting while also imparting an enhanced buffing action to the tire. Two reasons arising from the novel bent blade/tooth arrangement of the present invention are believed responsible for the enhanced stability which results.

First, it is believed the symmetrical blade configuration of the present invention contributes to the overall stability of the hub assembly. A force is exerted by the tire onto the first planar portion of the blade as it buffs the tire. Then, as the second planar portion of the blade sweeps across the tire, an equal and opposite force is exerted by the tire on that portion. These alternating, equal and opposing forces are believed to serve as constant stabilizers for the hub assembly as the hub rotates.

Second, the use of the elliptical curved working edge allows the working edge to present a uniform cylindrical surface of teeth to the tire. Because the blade is positioned at an angle to the hub's axis, the elliptical working surface is "converted" to a circular surface when mounted on and rotating with the hub. In this manner, the blade's teeth are applied more uniformly to the tire in the buffing operation.

While the bent blades of the present invention can be fabricated from a pre-formed rigid material as is conventional in the art, such as carbon-steel, they can also be usefully fabricated from a conformable, ductile material or from a conformable and resilient material.

A hybrid fabrication has been found suitable, as well. In this hybrid fabrication, a conformable ductile material is used to fabricate a planar blade. Then, the teeth, as well as a portion of the blade body extending approximately ⅛ inch below the teeth, are induction-hardened. The remaining blade body portion remains untreated, and the blade is then bent into proper position. In this way, should the hardened blade portion crack, the remaining blade portion will not crack, and the blade will remain intact. Alternatively, the ductile portion of the blade, in its annealed state, could occupy a middle portion of the blade.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 4 is a schematic illustration of the elliptical surfaces used in accordance with the present invention relative to conventional circular surfaces; and FIG. 5 is a diagram illustrating the determination of the elliptical surface for use in the present invention.

DETAILED DESCRIPTION OF THE PREFERRED EMBODIMENTS

Figure 1:
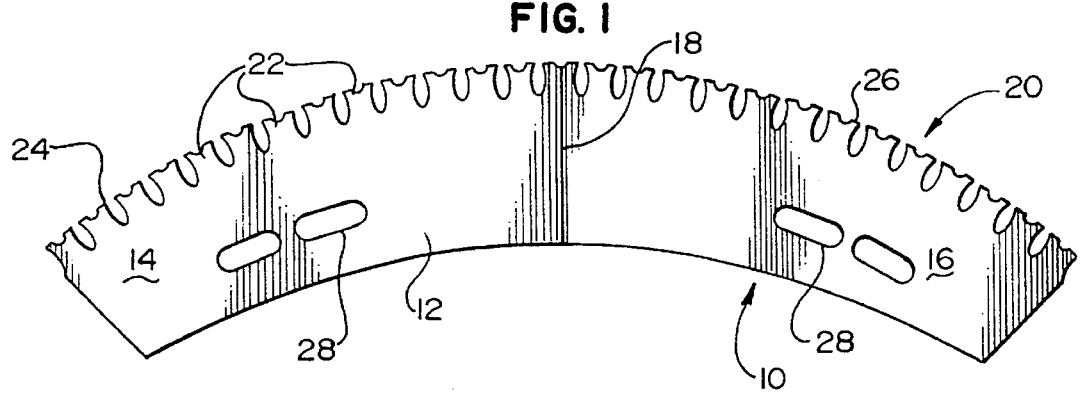
FIG. 1 is a side elevational view of the bent tire rasp blade of the present invention, showing the elliptical curved surfaces of the working edge.

In accordance with the present invention, the bent tire rasp blade, designated generally as 10, includes an elongated, generally arcuate, nonplanar body 12. The nonplanar or "bent" body has two planar end portions 14 and 16 which meet at a mid-portion of the body, thereby forming a vertex 18. Blade 10 also includes a working edge 20 having a plurality of teeth 22, as is well known in the art. The configuration of the working edge 20 includes two curved surfaces 24 and 26 each of which defines a portion of an ellipse. The two elliptical surfaces intersect at the midpoint of the blade. Because the blade 10 is bent along it longitudinal axis, when assembled into the tire buffing machine hub, each planar portion 14 and 16 will be disposed at an angle relative to the hub's direction of rotation (and to a plane normally intersecting the hub's axis). In turn, this angular orientation will, in effect, "convert" the elliptical working edge into a circular surface as presented to the tire being buffed. FIG. 4 is intended to more graphically illustrate the elliptical geometry concept of the present invention (the actual dimensions have been exaggerated for purposes of illustration). As shown, the typical circular working edge (in phantom) with radius R has been modified to comprise two elliptical surfaces $E_1$ and $E_2$.

Thus, the plurality of bent blades, all with dual elliptical working edges, will establish a generally cylindrical buffing surface which uniformly and evenly attacks the tire being buffed.

Those of skill in the art will understand that the specific elliptical surface to be used will be dependent upon the size of the particular blade and its angle of displacement. As shown in FIG. 5, the radius R is determined for the blade depending upon the particular rasp hub size (conventional hubs are typically 9, 10.5 or 11.5 inches in diameter). The Angle A is the angle of the inclination of the blade (or each planar portion) on the hub; that is, the angle formed by the blade or planar portion on the hub and a plane which is normal to the hub's axis of rotation. Given these data, the ellipse used to define the working edge of the blade may be made with a major axis 2X and a minor axis 2R, where X=R (Secant of A).

Figure 2:
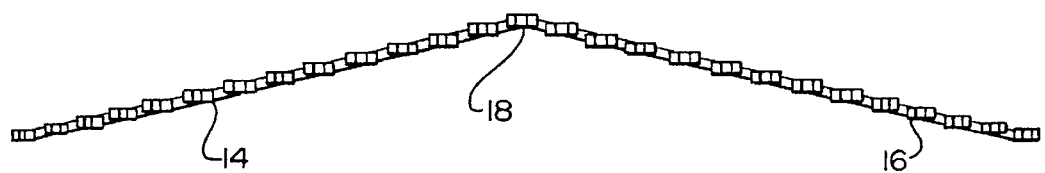
FIG. 2 is a plan view of the bent tire rasp blade of FIG. 1.
Figure 3:
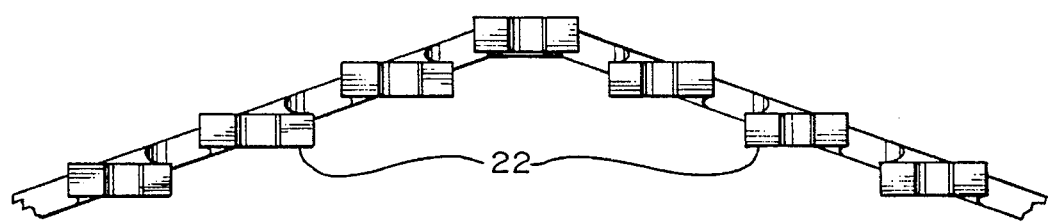
FIG. 3 is an enlarged plan view showing a portion of the bent rasp blade and the orientation of the teeth relative to the blade body.

In the particularly preferred configuration of the blade, shown in FIGS. 1 and 2, the angle each planar portion 14 and 16 makes with a plane normally intersecting the cylindrical hub axis is approximately 4° for a 9-inch diameter hub, and is approximately 3° for a 11.5-inch diameter hub.

It is also particularly advantageous in the practice of the present invention to position at least one set of mounting holes 28 at the mid-point of each planar end portion, 14 and 16 respectively. Positioning the mounting holes in this way allows the use of only a single support pin (in the associated rasp blade hub) for each blade planar portion. Having the pin centered on each planar portion will prevent displacement of the planar portion in the rotating hub, even in the rare event that the blade breaks along vertex 18. Thus, a safer design is achieved.

It will be appreciated by those skilled in the art that various modifications and changes can be made to the illustrated embodiments without departing from the spirit of the present invention. All such modifications and changes are intended to be covered by the appended claims.

I claim:

1. A tire rasp blade for use in a tire buffing machine which includes a rotating hub, comprising:

an elongated, generally arcuate and nonplanar body having two generally planar end portions each having first and second opposing sides, said generally planar end portions intersecting in a vertex positioned at a mid-portion of said body; and a working edge having two curved surfaces, each of said curved surfaces defining a portion of an ellipse having unequal major and minor axes and providing an effectively circular working edge when said blade is mounted to an rotated on said hub.

2. The tire rasp blade of claim 1, wherein said blade is symmetrical about its longitudinal midpoint.

3. The tire rasp blade of claim 2, wherein the two curved elliptical surfaces of said working edge intersect at said midpoint.

4. The tire rasp blade of claim 1, wherein said working edge includes a plurality of teeth all disposed at a uniform angle relative to said blade body; said teeth each having a leading edge and a trailing edge; said leading edges of the teeth of one planar end portion being displaced to said first side of said body and the leading edges of the teeth of the other planar end portion being displaced to said second side of said body.

5. A tire rasp blade for use in a tire buffing machine, comprising:

a rotating hub;

an elongated, generally arcuate and nonplanar body having two generally planar end portions intersecting in a vertex positioned at a mid-portion of said body, the angle each said planar end portion makes with a plane normally intersecting the rotating hub being approximately 4°; and a working edge having two curved surfaces, each of said curved surfaces defining a portion of an ellipse having unequal major and minor axes and providing an effectively circular working edge.

6. A tire rasp blade for use in a tire buffing machine, comprising:

a rotating hub;

an elongated, generally arcuate and nonplanar body having two generally planar end portions intersecting in a vertex positioned at a mid-portion of said body, the angle each said planar end portion makes with a plane normally intersecting the rotating hub being approximately 3°; and a working edge having two curved surfaces, each of said curved surfaces defining a portion of an ellipse having unequal major and minor axes and providing an effectively circular working edge.

7. The tire rasp blade of claim 1, wherein said body is generally rigid.

8. The tire rasp blade of claim 1, wherein said body is conformable and resilient.

9. The tire rasp blade of claim 1, wherein the working edge is induction-hardened.

10. The tire rasp blade of claim 1, further including two mounting holes, one positioned at the midpoint of each of said planar end portions.

11. The tire rasp blade of claim 1, wherein said working edge includes a plurality of teeth all disposed at a uniform angle relative to said blade body, said teeth being in substantially the same plane as the plane normal to the axis of hub rotation; said teeth each having a leading edge and a trailing edge; the leading edges of the teeth of one planar end portion being displaced to one side of said body and the leading edges of the teeth of the other planar end portion being displaced to the other side of said body.

* * * * *